April 5, 1938.  W. R. GOODALE  2,112,988
PERFORATING MACHINE
Filed Aug. 22, 1935  7 Sheets-Sheet 4
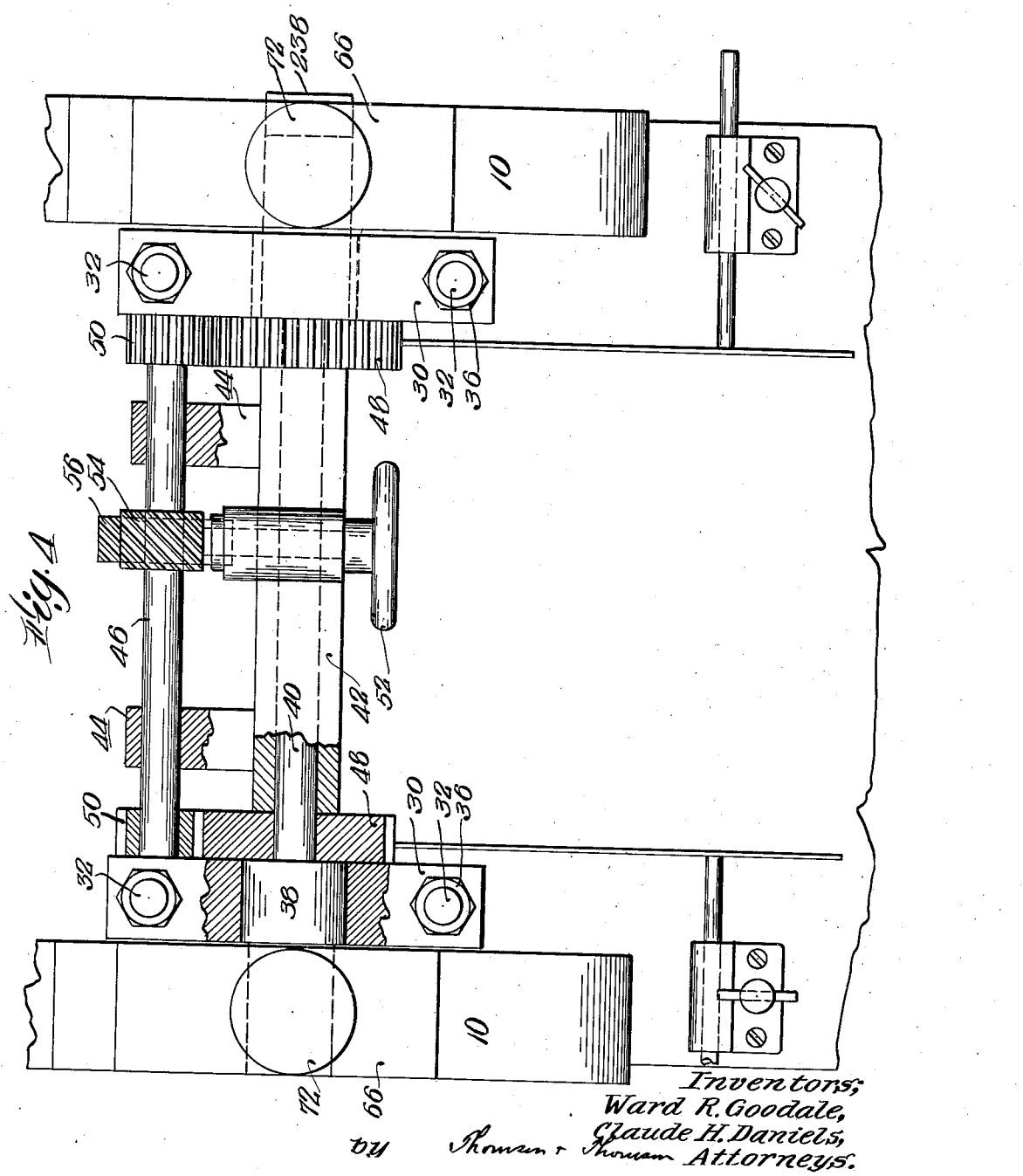

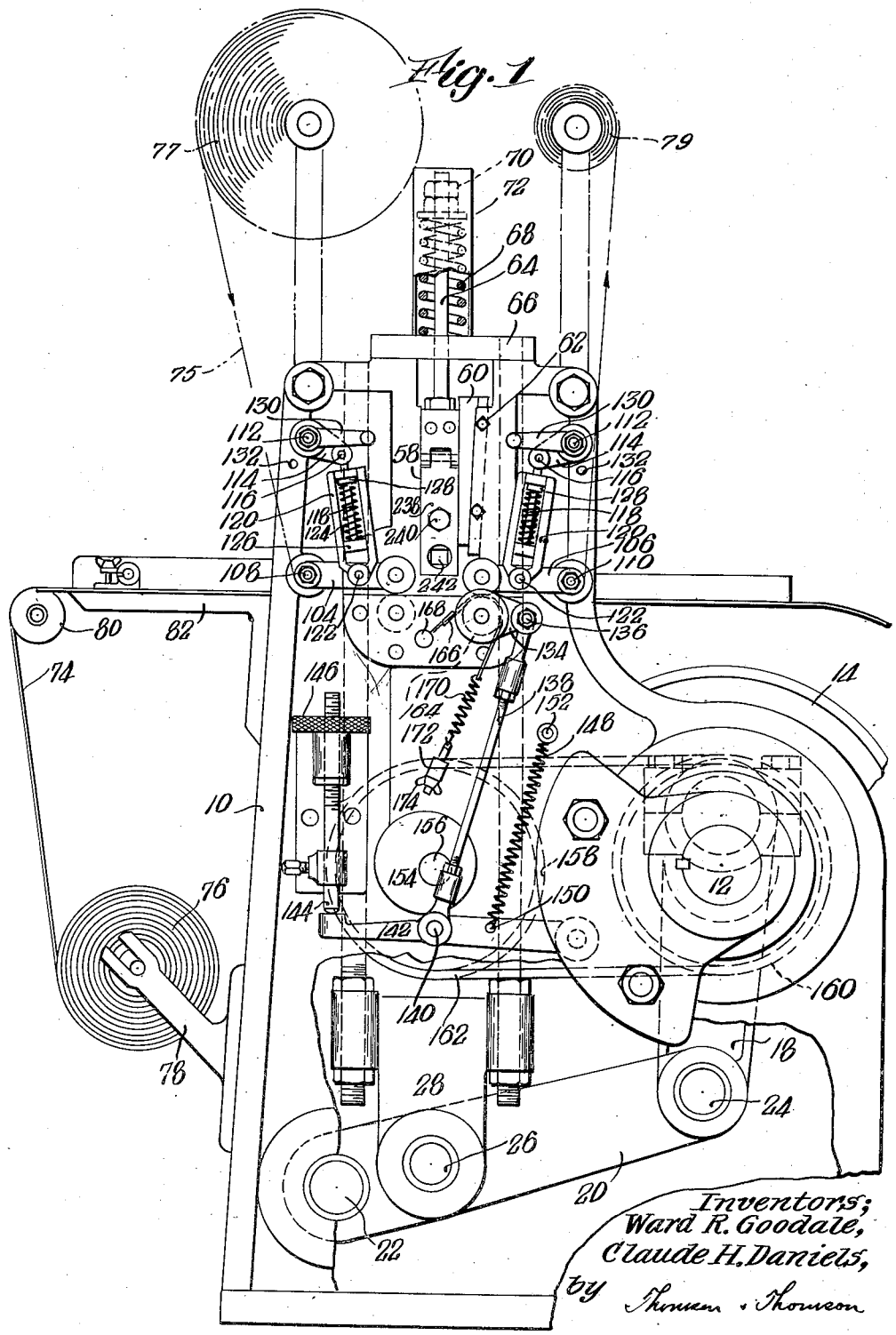

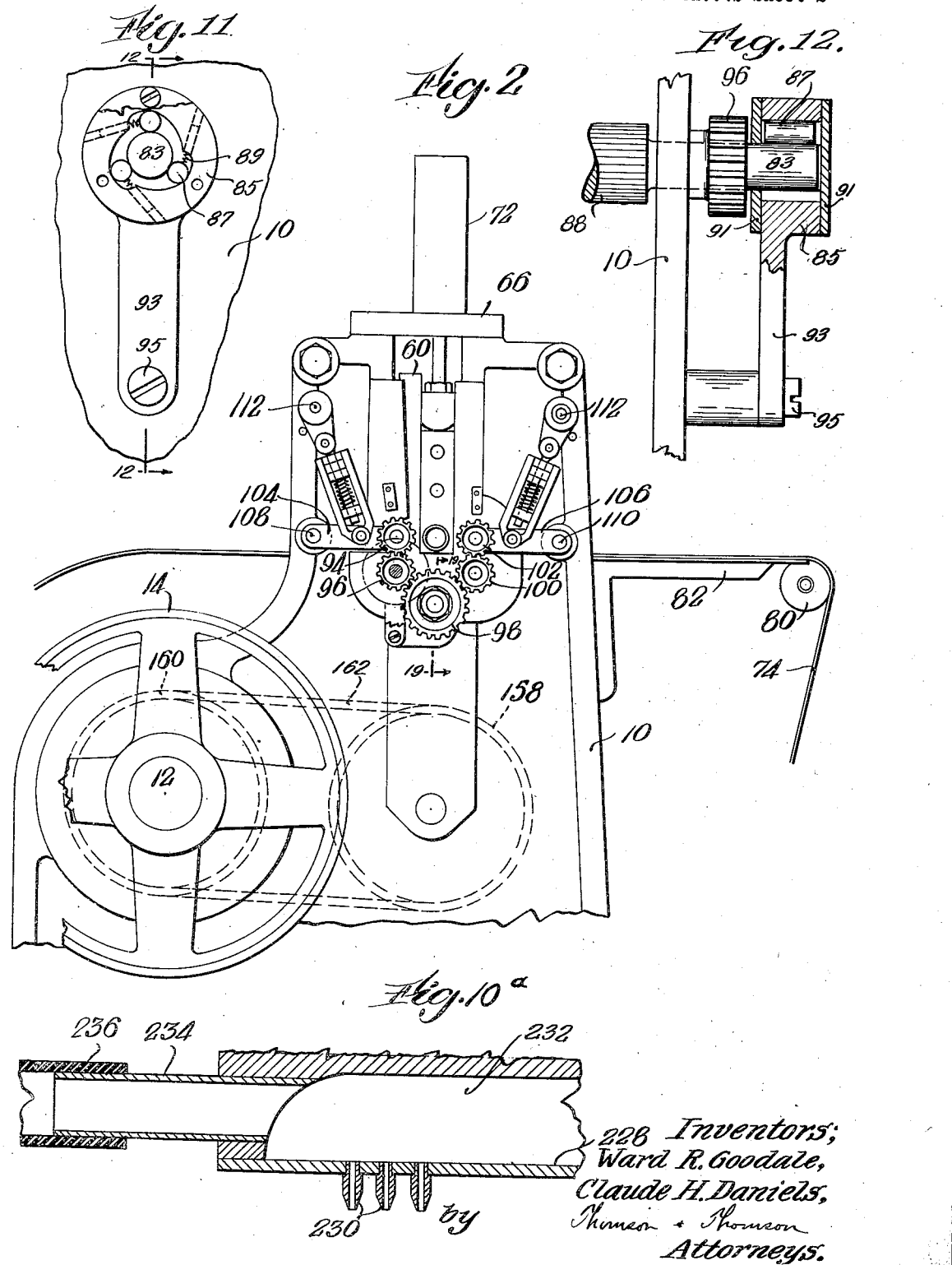

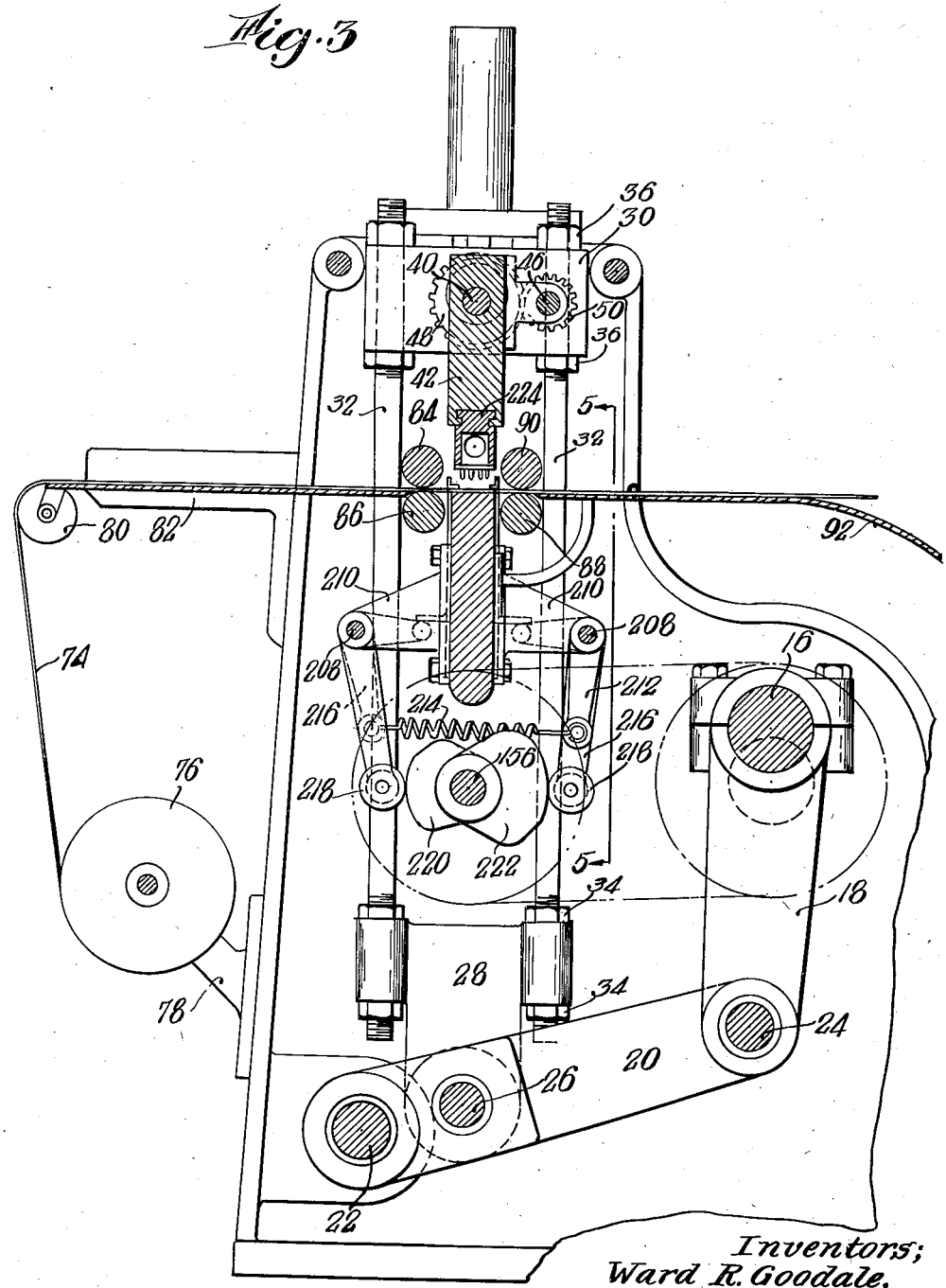

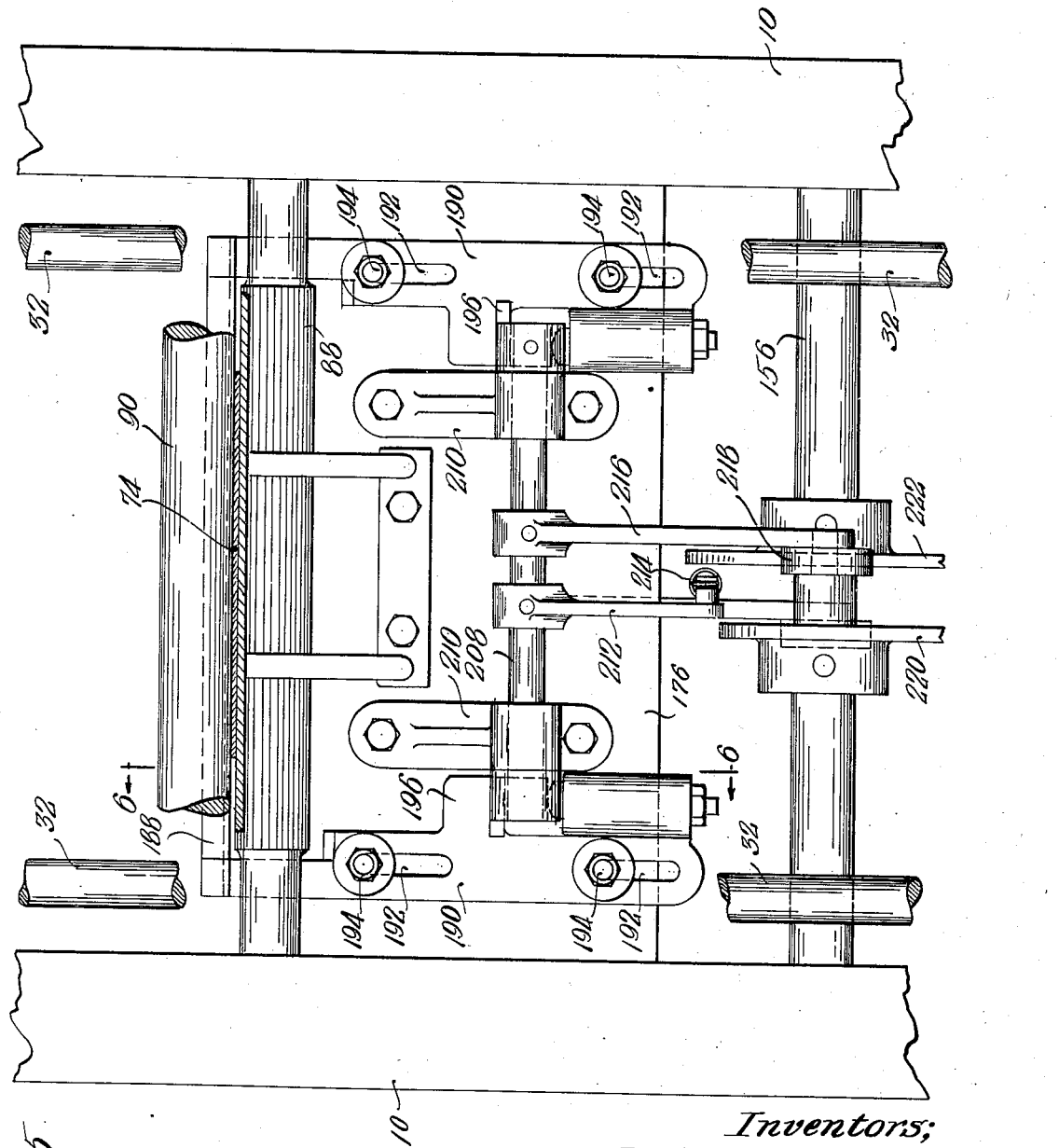

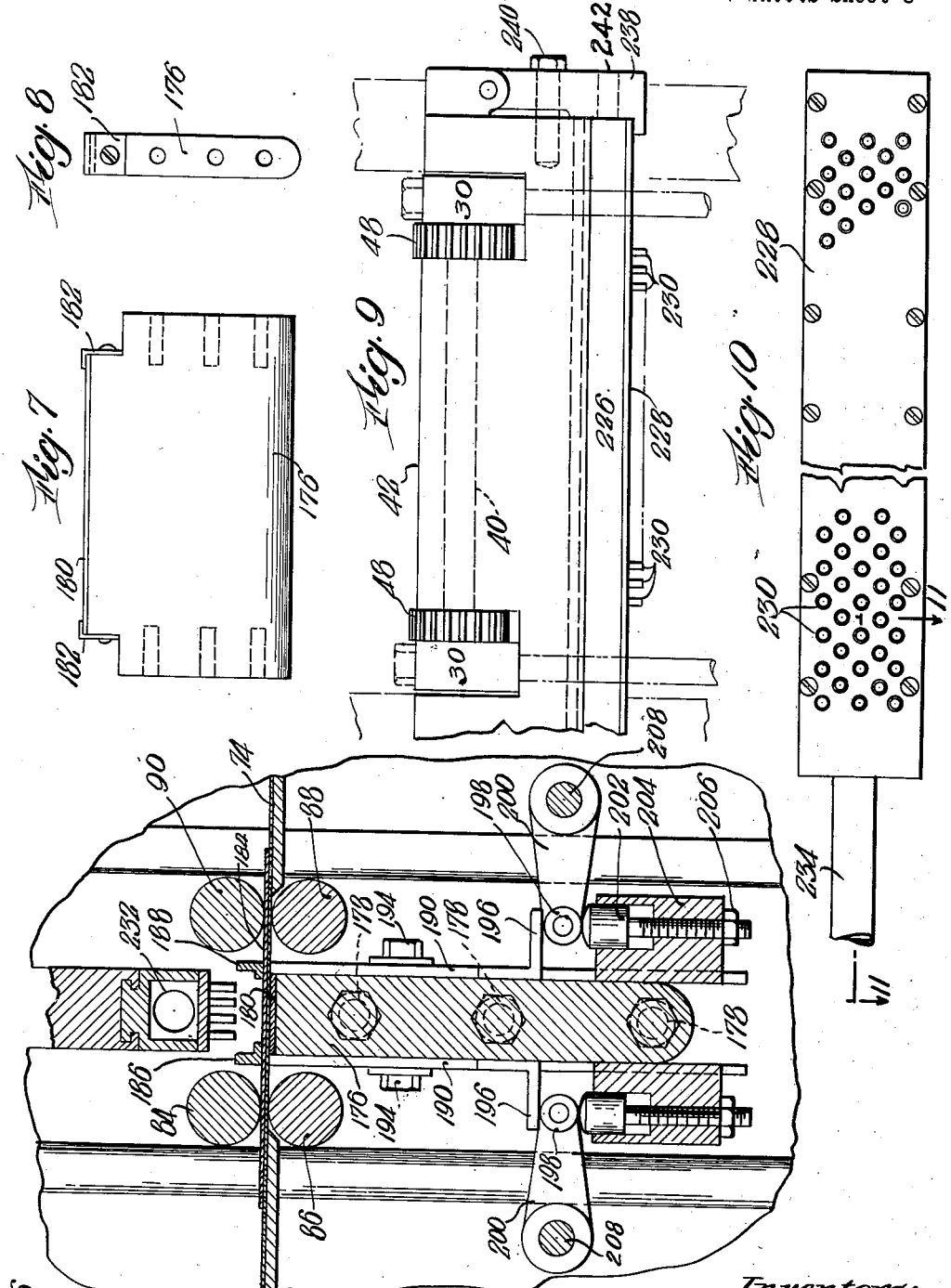

April 5, 1938.　　W. R. GOODALE　　2,112,988
PERFORATING MACHINE
Filed Aug. 22, 1935　　7 Sheets-Sheet 7
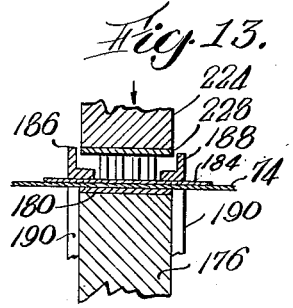
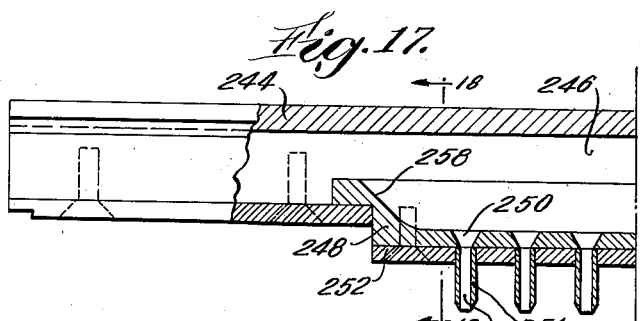
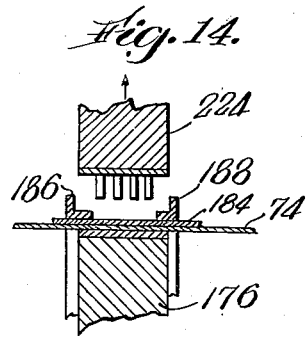
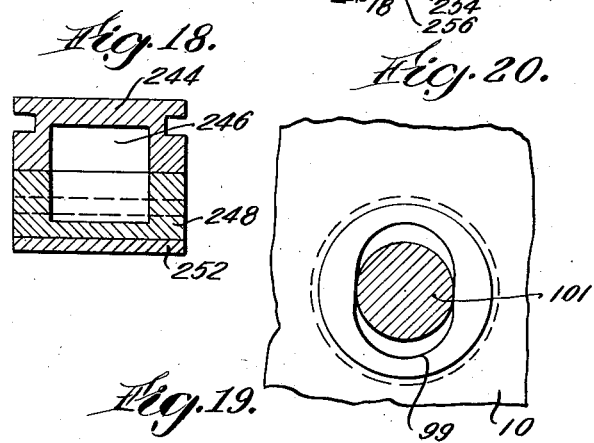
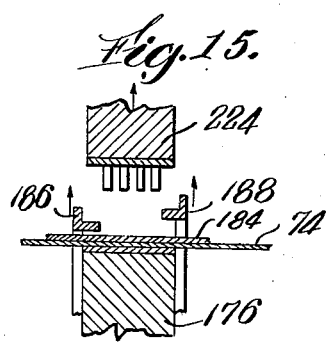
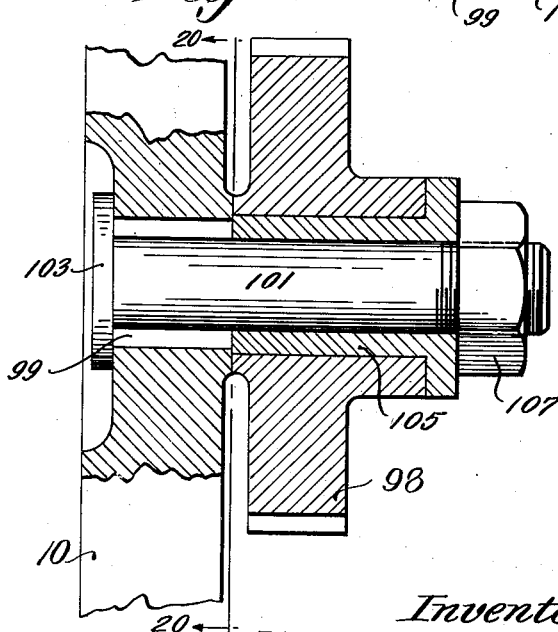
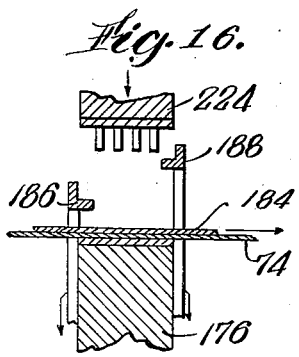
Inventors;
Ward R. Goodale,
Claude H. Daniels,
by Thomson + Thomson
Attorneys.

Patented Apr. 5, 1938

2,112,988

UNITED STATES PATENT OFFICE 2,112,988

PERFORATING MACHINE

Ward R. Goodale, Manchester, N. H., and Claude H. Daniels, Wellesley Hills, Mass., assignors, by mesne assignments, to said Claude H. Daniels, Greenwich, Conn.

Application August 22, 1935, Serial No. 37,364

12 Claims. (Cl. 164—89)

This invention relates to improvements in a perforating machine particularly designed to form perforations in shoe leather or other material or to perform pinking or embossing operations upon the leather.

Recently there has been a demand in the shoe trade for shoes having perforated uppers, and such uppers have been perforated in a machine which perforates the entire upper in one operation. The die of such a machine is very expensive since a large number of tubular die punches are required to cover the entire area of an upper. The speed of operation is slow since each piece of leather must be inserted by hand, punched, removed by hand and the chips must be cleared from the die before the next piece is inserted. It is expensive and time consuming to make a change in the perforated design.

It is an object of the present invention to provide a shoe leather perforating machine which employs a small inexpensive die punch which punches the leather pieces in a continuous step-by-step operation without stopping the machine, and which automatically removes the chips as they accumulate, and prevents clogging of the die punches.

In our machine the perforated design may be changed if desired while the machine is running by an adjustment which controls the step feed and therefore the spacing between the successive perforations formed by the individual strokes of the die. Furthermore, it is possible to obtain a wide variety of designs by changing the die punch, which is readily removable, for this purpose. Since the dies are small and relatively inexpensive, a number having different designs may be kept on hand.

An important feature of our machine which results in a high speed of operation is the automatic removal of the chips brought about by a current of air passing through the interior of the die and produced by suitable air exhaustion means. By the use of this feature it is possible to employ an overhead movable die since the chips are rapidly removed as they pass upwards through the tubular dies.

The provision of an overhead movable die is a novel feature of our invention and enables the feeding of a buffer strip over the bedplate on which the pieces of leather may be laid by the operator at the feeding end of the machine.

Additional objects and advantages of the improvements will be more readily apparent from the following detail description of a preferred embodiment of the invention as illustrated in the attached drawings.

In the drawings:

Fig. 1 is a side elevation of the machine, a portion of the frame being broken away at the bottom to show the inner parts.

Fig. 2 is a detail side elevation looking at the machine from the opposite side from that of Fig. 1.

Fig. 3 is a vertical cross section of the machine.

Fig. 4 is a detail plan view of the upper portion of the machine partially shown in broken section.

Fig. 5 is an enlarged view of a portion of the machine taken from the delivery side, a portion of the apron being shown in section.

Fig. 6 is a detail vertical section showing the means for operating the presser and stripper members.

Fig. 7 is a side view of the bedplate.

Fig. 8 is an end view of the bedplate.

Fig. 9 is a front elevation showing the plunger and die holder.

Fig. 10 is a bottom view of the die member.

Fig. 10—A is a detail section showing the connection of the suction pipe to the die member.

Fig. 11 is a detail elevation of the roller clutch means, portions of the cover being broken away.

Fig. 12 is a side view partially in section showing the roller clutch.

Figs. 13–16 are detail views shown in vertical section illustrating the various relative positions of the die member and presser and stripper members.

Fig. 17 is a view taken in longitudinal section showing a modification of the die holder.

Fig. 18 is a cross section taken on the plane indicated 18—18 in Fig. 17.

Fig. 19 is a detail section taken on the plane indicated 19—19 in Fig. 2 showing the mounting of the idler gear.

Fig. 20 is a detail section taken on the plane indicated 20—20 in Fig. 19.

The machine frame 10 supports a drive shaft 12 in bearings at opposite sides of the frame. The shaft 12 has a driving pulley 14 mounted thereon which transmits rotation to the shaft from a suitable source of power. The shaft 12 has a crank pin 16 engaged by one end of a link 18. A rocker arm 20 is mounted on the frame by the fulcrum pivot 22 and is connected to link 18 by a pivot 24. A shaft 26 passes through the spaced legs of the rocker arm 20 and supports a pair of lower cross-heads 28 which are connected to a pair of upper cross-heads 30 by the pull rods 32. The nuts 34 and 36 threaded to the pull rods provide for a rough adjustment of the spacing between the upper and lower sets of cross-heads.

The upper crossheads 30 are formed to receive eccentrics 38 at the opposite ends of a shaft 40 which supports the movable die head 42. The shaft 40 together with eccentrics 38 may be rotated with respect to the die head 42 to provide for a fine adjustment of the effective die stroke with respect to the pressure plate and thus vary the stroke and operative pressure of the die members. Brackets 44 are provided on the head 42 and support a countershaft 46. A pair of gears 48 on shaft 40 mesh with a pair of gears 50 on countershaft 46. An adjusting handle 52 is mounted transversely on the die head 42 and is connected to a worm gear 54 which meshes with a worm wheel 56 on the countershaft 46. Adjustment is thus secured by turning the handle 52.

The movable die head 42 is guided for vertical movement with respect to the frame 10 by engaging the fixed guides 58 on one side and the adjustable guide members 60 on the opposite side. The members 60 are wedge shaped and engage a wedge shaped portion of the frame for vertical adjustment with respect thereto. The wedge members 60 may be fixed in position by the bolts 62.

A tension rod 64 is fixed to each cross head 30 and extends upwardly through a cap plate 66 on top of the frame 10. Compression springs 68 receive the rods 64 and seat at their lower ends upon the cap plate 66 while the upper ends of the springs seat against adjustable lock nuts 70 on the rods 64. The heavy coil springs 68 are enclosed by housings 72. The springs act to normally hold the cross heads in their upper positions.

The leather pieces perforated by the machine are laid on a buffer strip of paper 74 which is drawn from a roll 76 rotatably mounted at the feeding end of the machine on brackets 78. The buffer strip is guided over roller 80 across a feed table 82, between two sets of feed rollers 84, 86, 88, and 90, and is finally delivered across apron 92. The lower rollers may have longitudinally corrugated surfaces as shown in Fig. 5. As indicated by dotted lines in Fig. 1, an upper buffer strip 75 may be used as well as the lower strip 74 in which case the pieces to be perforated will be retained between the upper and lower strips. The strip 75 may travel from the feed roll 77 to the delivery roll 79. The rolls 77 and 79 may be used for conveying continuous strip material through the machine for perforation.

The rollers are included in a train of gears 94, 96, 98, 100, and 102, as shown in Fig. 2, the gear 98 being an idler gear between the two sets of rolls, and the other gears being carried by the rollers. The mounting of the idler gear 98 is shown in detail in Figs. 19 and 20. The frame 10 has a slot 99 adapted to receive the pintle 101 having a head 103 abutting the inner side of the frame. A sleeve 105 is received on the pintle 101 and is forced into abutment with the outer side of the frame by the nut 107 threaded to the pintle. The gear 98 is free to rotate on the sleeve 105 and may be raised into close mesh with the gears 96 and 100, thus maintaining uniform relative motion between the two sets of rollers. Each of the upper rollers 84 and 90 is movably mounted by being supported at each end upon lever arms 104, 106 pivoted to the frame at 108, 110. Cross shafts 112 are mounted in the upper part of the frame and carry toggle arms 114 pivoted at 116 to rods 118 which slide into lever members 120 pivoted at 122 to the levers 104, 106. Compression spring members 124 seat between abutments 126 on the levers 120 and adjustable collars 128 on rods 118. The shafts may be turned from one side of the frame by handles 130. Stop pins 132 are provided on the frame for holding the toggle links in locked position as shown in Fig. 2.

Gear 100 is intermittently driven in one direction by a lever arm 134 pivotally connected at 136 to pull rod 138 which is pivoted at 140 on rocker arm 142. The arm 142 is normally held in contact with an adjustable stop 144, having a knurled adjusting nut 146, by a tension spring 148 connected at 150 to the arm 142 and at 152 to the frame. The rocker arm 142 is operated by a cam 154 on shaft 156. The shaft 156 is driven from shaft 12 by sprocket gears 158 and 160 and sprocket chain 162. The arm 134 produces oscillation of drum 164, but movement is transmitted to gear 100 in one direction only through a roller clutch. A friction band 166 extends around the drum 164 and is fixed at 168 to the frame. The free end of the band 166 is attached to tension spring 170, which is adjustably secured to a boss 172 on the frame by wing nut 174. If desired, an additional one way roller clutch may be used at the opposite end of roller 88 to prevent backlash, as illustrated in detail in Figs. 11 and 12. The roller 88 has a stub extension 83 received in the housing 85 for rollers 87 which are normally urged towards gripping positions by springs 89. Cover plates 91 are provided to prevent displacement of the rollers from the housing, and rotation of the housing is prevented by the arm 93 which is fixed to the frame by screw 95.

The bedplate 176 beneath the work is illustrated in Fig. 7 and is bolted at its ends to the frame by bolts 178. The top surface of the bedplate may be covered with Babbitt metal, brass, fibre board or wood 180, held by brackets 182.

In Fig. 6, a piece of leather 184 is shown resting on the paper strip 74 and passing beneath the rollers 84 and 90. The leather piece is held firmly in position while being perforated by a front presser bar 186 and a rear presser bar 188. The presser bars are angular in cross section and, as will be later described, act as strippers as well as pressers. Each of the bars 186 and 188 is mounted on the bedplate 176 for vertical movement. Each of the presser bars 186 and 188 has a pair of guide straps 190 provided with vertical slots 192 engaging bolts 194 fixed to the bedplate 176. Each of the guide straps 190 has an outwardly directed lip 196 resting on a roller 198 at the end of a pivoted lever arm 200. The underside of the roller 198 is engaged by an abutment member 202 threaded into a bracket 204 on the strap 190 and secured by nut 206.

At each side of the bedplate 176 the levers 200 are mounted on a cross shaft 208 rotatably supported by brackets 210 on the bedplate 176. Each of the shafts 208 has a lever arm 212, and the pair of lever arms 212 are connected by a tension spring 214. The spring normally acts to force the presser bars upwardly. Each of the shafts has a second lever arm 216 having a roller 218 at its outer end. The shaft 156 has a pair of cam members 220 and 222 mounted thereon. The cam 220 engages a roller 218 and moves the front presser bar 186 downwardly against the force of spring 214. The cam 222 similarly operates the rear presser bar 188.

The movable die head 42 is formed with a T-shaped groove adapted to detachably receive the T-shaped head 224 of a removable die member 226 which includes a die plate 228 having a plurality of tubular die punches 230. The die member 226 has a hollow chamber 232 adapted to receive the chips punched out of the leather and the chips are removed through a suction pipe 234 to which a rubber suction hose 236 may be connected. The die member is held in fixed position by a locking plate 238 pivoted to the die head 42 and secured by bolt 240. The locking plate has an inlet opening 242.

Another form of die holder is illustrated in Figs. 17 and 18. The die holder 244 has a longitudinal passageway 246 for the removal of the chips. A hardened adapter plate 248 is mounted as illustrated in a bottom opening of the die holder. The plate 248 has openings 250 in alignment with the openings in a plate 252 which is attached thereto. The die punches 254 are pressed into the plate 252 and abut against the hardened plate 248. The holes 256 in the tubular dies register with the openings 250 and the removal of the chips is facilitated by the smooth curve 258 formed on the plate 248.

In operation of the machine, the die member is first inserted having the tubular die punches for making the desired perforations in the work. The paper buffer strip is fed into the machine between the pairs of feeding rollers which may be initially in the positions illustrated in Fig. 1, in which the pressure is not applied holding the upper rollers against the lower rollers. After the buffer strip is properly fed the lever members 130 may be swung to place the upper rollers under spring pressure against the lower rollers. The machine may then be operated and the stroke of the die plunger regulated by the adjusting handle 52 so that the die punches are cleanly perforating the leather, as shown by clear imprints on the buffer strip. Also, the step feed of the machine may be adjusted by the screw member 146 so that the spacing of the perforations is correct. While the machine is operating, suitable air exhaustion means have been brought into operation to produce a current of air through the die member for the removal of the chips. After the machine has been properly adjusted the work may be fed into the machine by laying the leather pieces upon the buffer strip as it passes over the apron at the feeding end of the machine.

Figs. 13-16 illustrate the various other positions of the presser and stripper members with respect to the die punch. In Fig. 13 the plunger is just completing its downward stroke, and the leather piece of work is being firmly held in position on the buffer strip, which is stationary, by the front and rear presser members 186 and 188. In Fig. 14 the die is being raised and the presser members 186 and 188 act as strippers to clear the leather piece from the die punch. In Fig. 15 the presser members are moving upwards, thereby releasing their pressure upon the leather piece, and it will be understood that the rear presser member 188 is moving upwards faster than the front member 186. In Fig. 16 the die member has reached its upward position and is beginning the downward stroke. The buffer strip is moving, carrying the leather piece forward into position for the next perforating operation; it will be noted that the rear presser member 188 has moved upwards farther than the front member 186 and enables a leather piece to be properly fed through even though the feeding end has curled upwards, as may occur. The perforated pieces of leather are removed from the apron at the delivery end of the machine. The chips of leather cut out by the die punches are forced upwards through the tubular dies into the hollow portion of the die member, and are removed by the current of air. As shown in Fig. 1, an upper paper strip may be used in addition to the lower paper strip and may be found particularly desirable where the material being perforated is sticky, in which case the chips might stick together and clog the dies. By using the upper paper strip, each chip of the work is spaced apart to avoid sticking to the next chip by the paper strip, and thereby the chips will be more readily cleared from the die.

It will be noted that the feeding of the material by the rolls must be quite uniform in order to prevent any variations in the design being punched, and for this reason it is desirable to employ the roller clutch which prevents any backward movement of the rolls and a friction brake which prevents forward movement of the rolls except as produced by the cam lever means. Various changes and modifications may be resorted to in the practice of our invention without departing from the spirit thereof as expressed in the appended claims.

We claim:

1. In a perforating machine, a movable die head, a plurality of tubular dies mounted in said die head, said die head having a chamber therein to receive the chips from said tubular dies, said die head having an air inlet opening at one end and an air exhaust opening at the other end whereby a current of air through said chamber may be produced for the removal of said chips.

2. In a perforating machine for leather or similar material carried through the machine on a buffer strip, a vertically reciprocable plunger, a die head on said plunger, a plurality of dies mounted in said die head, reciprocable cross-head members at the ends of said plunger for operation of said plunger and means for adjusting the stroke of said plunger comprising rotatable eccentric members through which the plunger is mounted on the cross-head members, a rotatable adjusting member mounted on said crosshead members, and means for rotating said eccentrics from said adjusting member to vary the stroke and operative pressure of the die members.

3. In a machine for operating upon leather or similar material to form designs thereon, a bedplate over which the work is fed, a die member above the bed-plate, means for producing reciprocating strokes of said die member to and from said bed-plate, means for regulating the stroke and operative pressure of the die member, said die member having a plurality of dies to form a portion only of the complete design on the work and means for intermittently feeding the work beneath said dies over the bed-plate whereby the complete design is formed by successive strokes of the dies and means for regulating the feed of the work to vary the complete design.

4. In a perforating machine, relatively movable die members, one of said members having a plurality of tubular dies for forming a portion only of a complete design, means for operating said die members and means for intermittently feeding the work between said die members whereby the complete design in a piece of work is formed by successive strokes of the tubular dies.

5. In a machine of the character described, relatively movable die members, upper and lower cooperating feed rolls disposed adjacent the dies at each side thereof, intermittently operable means transmitting movement to one of said rolls, means for preventing retractive movement of said roll, and gear means transmitting movement from the driven roll to the other rolls.

6. In a machine of the character described relatively movable die members, a plurality of dies on one of said members, cooperating feed rolls for intermittently feeding the work between said die members, reciprocating presser members operative in timed relation to said die members for holding the work stationary as the die members are forced together, said presser members also acting as strippers to remove the work from the dies as the die members separate.

7. In a machine of the character described, a bed plate for the work, a vertically movable die above said bedplate, means for producing reciprocating movement of the die, rolls for intermittently feeding the work beneath said die, reciprocating presser members operative in timed relation to the die for holding the work stationary while the die engages the work, one of said members pressing downwardly upon the work in front of the die and another pressing downwardly behind the die, the latter member having a larger travel than the former so that it will not interfere with the feeding of the work, and common driving means for reciprocating the members from work holding position to work stripping position while the die is operative and inactive, respectively.

8. In a machine of the character described, a bedplate for the work, a vertically movable die above said bedplate, means for producing reciprocating movement of the die, upper and lower feed rolls arranged in pairs at opposite sides of the die, the upper rolls being movable relative to the lower rolls, yielding means for pressing the upper rolls against the lower rolls including toggle arms, operative upon the respective upper rolls, and handles for releasing said upper rolls.

9. In a machine of the class described, a bedplate for the work, a vertically reciprocating die above the bedplate, means for moving the die toward and from the bedplate, presser members for holding the work during operative movement of the die, and feed rolls automatically actuable for intermittently moving the work beneath the die during inactive movement thereof.

10. In a machine of the class described, a bedplate for the work, a die head vertically movable above the bedplate, a die plate removably secured to the die head and having projecting members engageable with the work, means for producing reciprocating movement of the die head, and means for holding the work while the die members are engaged therewith and for stripping the work from said members during upward movement of the die head.

11. In a machine of the class described, a bedplate for the work, a die head vertically movable above the bedplate, a die plate removably secured to the die head and having projecting members engageable with the work, means for producing reciprocating movement of the die head, and means for holding the work while the die members are engaged therewith and for stripping the work from said members during upward movement of the die head, feeding mechanism for intermittently moving the work beneath the die during inactive movement thereof, and common driving means for operating the die head, the holding and stripping means and the feeding mechanism.

12. A machine for perforating leather or similar sheet material, comprising a stationary bedplate for the work to be perforated, a die movable above the bedplate toward and from the work, said die having a chamber therein, a plurality of punches provided with openings leading to the chamber and a port leading outwardly of the chamber so that chips passing through the punches and into the chamber may be discharged through said port, feed rolls for intermittently moving the work over the bedplate and beneath the die, reciprocating presser members for holding the work during operative movement of the die and for stripping the work from said punches during its movement away from the work, and common driving means for operating the reciprocating die, the feed rolls and the presser members in automatic sequence.

WARD R. GOODALE.
CLAUDE H. DANIELS.